Oct. 4, 1949.  L. A. WILLIAMS, JR  2,483,747
FUEL CONTROL APPARATUS

Filed May 2, 1945  2 Sheets-Sheet 1

Patented Oct. 4, 1949

2,483,747

UNITED STATES PATENT OFFICE 2,483,747

FUEL CONTROL APPARATUS

Lynn A. Williams, Jr., Northfield, Ill., assignor to Stewart-Warner Corporation, Chicago, Ill., a corporation of Virginia Application May 2, 1945, Serial No. 591,543

1 Claim. (Cl. 236—68)

My invention relates generally to fuel control apparatus, particularly apparatus for controlling the flow of liquid fuel to a vehicle heater.

In liquid fuel burning heaters of the sealed combustion type, as used for example for heating the passenger compartments of automobiles, the fuel is supplied from the engine operated fuel pump of the automobile, and the pressure at which the fuel is supplied to the heater may therefore vary throughout a substantial range, depending upon the speed of operation of the engine. In heaters of this type, it is common practice to utilize an electric igniter of the hot wire type. A short interval of time is required to heat it to a temperature at which it will ignite the fuel, and, if the fuel is supplied to the heater during this time interval, some of the fuel may pass through the heater without being burned, or it may collect in various parts of the heater. Furthermore, the presence of the fuel in the heater while the igniter is being heated to its ignition temperature, slows down the heating of the igniter because some of the heat generated thereby is lost in vaporizing the fuel prior to the time that the igniter is hot enough to ignite the vapor.

It is therefore one of the objects of the invention to provide an improved fuel control valve for heaters, in which the opening of the fuel supply valve is delayed until the igniter has been heated to a temperature at which it can ignite the fuel.

A further object of the invention is to provide an improved electrically controlled fuel valve.

A further object is to provide a fuel line valve which operates to regulate the pressure at which the fuel is supplied, and also is electrically operated to permit and stop the flow of fuel.

Other objects will appear from the following description, reference being had to the accompanying drawings, in which.

Figure 1:
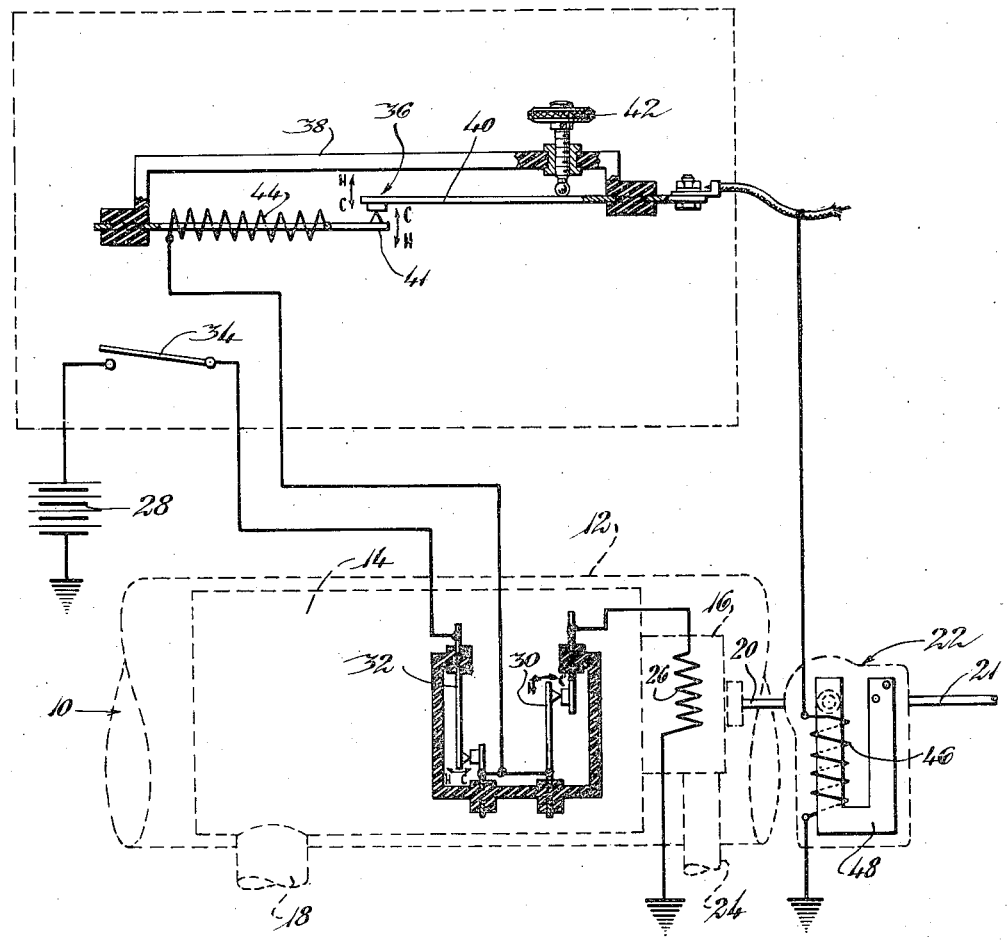
Fig. 1 is a schematic wiring diagram of the control circuits and diagrammatically illustrates the control elements, parts of the heater being shown in phantom.

Referring to Fig. 1, a heater 10 is illustrated in phantom as comprising a casing 12 in which is located a heat exchanger 14 and a combustion chamber 16, from which the products of combustion flow through the heat exchanger and are discharged through an exhaust conduit 18. Fuel is supplied to the combustion chamber 16 through a pipe 20 from a suitable source, such as the fuel pump of an automobile. The flow of fuel through the pipe 20 is controlled by a fuel valve 22, while air for combustion is supplied to the combustion chamber through a conduit 24.

An electrical igniter 26 of the hot wire type is suitably located to ignite the fuel mixture in the combustion chamber, and has one of its terminals grounded. The other terminal is adapted to be connected to a source of electrical energy such as the automobile battery 28, through a thermostatic igniter deenergizing switch 30, a thermostatic overheat switch 32, and a manually operable heater control main switch 34.

Located in the passenger compartment of the automobile, or in any other space to be heated by the heater, is a control switch 36 comprising an insulating support 38 for a pair of thermostatic bimetal switch arms 40 and 41. The setting of the switch arm 40 may be varied by means of an adjusting thumb screw 42.

The switch arm 41 has a heating coil 44 wound about it, but electrically insulated therefrom. A heating coil 46 is similarly wound about one leg of a U-shaped bimetal thermostatic actuator 48 forming part of the fuel valve 22. One terminal of the heating coil 46 is grounded, while the other terminal is connected to the switch arm 40, the circuit to the battery 28 being completed through the heating coil 44, overheat switch 32, and main switch 34.

When the main switch is closed, assuming the heater to be cold and the overheat switch 32 and igniter deenergizing switch 30 closed, and assuming further that the switch arms 40 and 41 are in the positions shown and the switch 36 thus closed, closure of the main switch 34 will result in supplying current to the igniter 26 and also to the two heating coils 44 and 46.

When the switch arm 41 is heated, it flexes downwardly tending to move away from the switch arm 40. The switch arm 40 moves downwardly when cold so that the switch will remain closed for a longer interval when the passenger compartment is cold than when it is warm. As long as the switch 36 remains closed, current is also supplied to the heating coil 46 which, as presently will appear, operates in a manner to open the fuel valve when its heating coil 46 is energized. The heating coils 44 and 46 are of relatively high resistance so that the bimetals around which they are wound will heat up rather slowly, thus introducing a time delay in the operation of the fuel valve.

Figure 2:
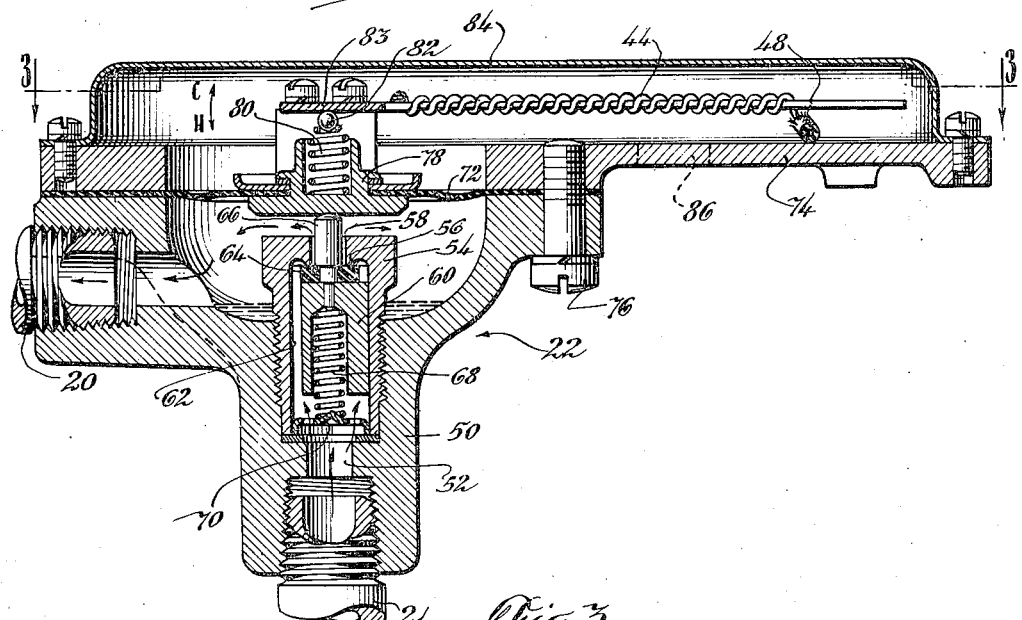
Fig. 2 is a central vertical sectional view of the improved control valve, taken on the line 2—2 of Fig. 3.
Figure 3:
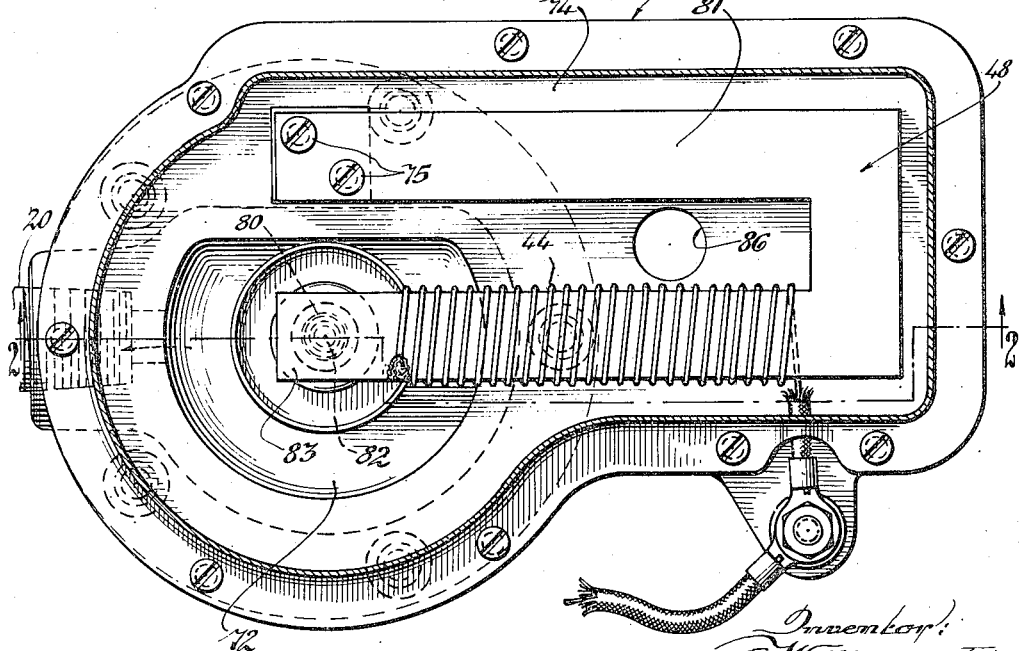
Fig. 3 is a sectional view taken on the line 3—3 of Fig. 2.

The fuel valve 22 is preferably of the construction illustrated in Figs. 2 and 3, and comprises a body 50 having the fuel supply pipe 21 connected thereto to supply fuel through an inlet port 52. A valve seat member 54 is threaded in the body 50 and is provided with a valve seat 56 and a port 58. Within the valve seat member 54 there is a cylindrical bore providing a guide for a valve stem 60, which is of noncircular cross section to provide a passageway 62 for the flow of fuel. A valve disc 64 is secured to the valve stem 60 by a shouldered pin 66 pressed into the stem. The stem 60 is recessed to receive a helical coil spring 68 which rests upon an apertured centering seat 70 and normally holds the valve disc 64 in engagement with its seat 56.

A flexible diaphragm 72 has its edge clamped between the body 22 and a plate 74 by a plurality of cap screws 76. The diaphragm 72 has a central opening which is closed by a member 78, the latter being suitably clamped to the diaphragm in a fuel tight manner. The member 78 has a bore for the reception of a compression coil spring 80, the upper turn of which is of reduced diameter and has a ballbearing 82 silver soldered or brazed thereto. The U-shaped bimetal 48 is symmetrical and has one end of one leg 81 thereof fastened to the plate 74 by screws 75. The other leg 83 of this U-shaped bimetal which has the electrical heater winding 44 thereon, has its end located directly above the ball 82 so as normally to be in contact therewith. The leg 81 flexes in response to ambient temperature and thus acts as an ambient temperature compensator for the leg 83. The U-shaped bimetal is protected by a thin sheet metal cover 84 and the space enclosed by this cover has free access to the atmosphere through a hole 86 formed in the plate 74. The flow through the pipe 20 will be restricted by a small orifice in a well known manner.

In operation, the main switch 34 is closed by the operator of the vehicle, thus supplying current through the normally closed overheat switch 38, the heater winding 44, switch 36, and heater winding 46. In addition, current will be supplied to the igniter 26 through the igniter denergizing switch 30.

As the leg 83 of the U-shaped bimetal 48 is heated, its free end presses downwardly upon the diaphragm through the spring 80, and after it has been heated for a length of time sufficient for the igniter 26 to have attained ignition temperature, will exert a sufficient force in a downward direction upon the pin 66 to move the the valve disc 64 from its seat 56. Fuel may therefore flow past the valve into the chamber beneath the diaphragm 72, exerting pressure thereon opposing that applied by the leg 83. At the same time, the bimetal switch arm 41 will be heated and commence flexing downwardly. Such downward flexure will, under the usual operating conditions, be accompanied by a corresponding flexure of the bimetal arm 40 so that the switch 36 will remain closed for a substantial time interval.

As soon as the fuel commences flowing to the heater past the valve 64, it will be ignited by the igniter and ventilating air flowing through the casing 12 will commence delivering heat to the space to be heated. As the heater approaches its normal operating temperature, the igniter deenergizing switch 30 will open. As the space in which the control switch 36 is located becomes heated, the bimetal switch arm 40 will tend to flex upwardly and when a temperature determined by the adjustment of the thumb nut 42 is attained, the switch 36 will open, thereby cutting off the supply of current to the two heater windings 44 and 46.

Due to the residual heat in the leg 83, it will be some time before the pressure which this leg applies to the pin 66 will be relieved sufficiently to permit the spring 68 to close the valve 64. By the time that the force applied by the leg 83 is no longer sufficient to hold the valve 66 open, the bimetal switch arm 41 will also have cooled and flexed upwardly so as again to close the switch 36, thereby reenergizing the heater windings 44 and 46, whereupon the cycle of operation of the switch 36 and leg 83 will be repeated.

As the pressure of the fuel within the chamber beneath the diaphragm builds up, the pressure which is exerted on the diaphragm 72 by the fuel will tend to cause the valve 64 to move toward closed position, such movement being permitted but resisted by the spring 80 and the resiliency of the U-shaped bimetal 48.

Due to the time constant of the cycle imposed by the time required to heat and cool the bimetal switch arm 41, fuel will usually be continuously supplied to the heater, but the average rate at which it flows will depend upon the relative length of time that the switch 36 is closed and opened. This is caused by the fact that when the switch is closed for a longer interval, the leg 81 will be heated to a higher temperature and therefore hold the valve 64 open for a longer period of time and permit the fuel in the chamber below the diaphragm 72 to attain a higher pressure, and thus an increased flow rate. The length of the portion of the cycle during which the switch 36 is closed is, of course, determined by the temperature of the air in the space being heated, as it affects the switch arm 40, for the reason that as the temperature drops, the switch arm 40 will flex downwardly and the switch arm 41 will have to be heated to a higher temperature before it is effective to open the switch 36, and correspondingly, this switch will be open for a shorter length of time because the switch arm 41 will take a shorter time to cool to a temperature at which it flexes upwardly sufficiently again to make contact with the switch arm 40.

As is customary in heaters of this type, the igniter deenergizing switch 30 recloses upon sufficient cooling of the heater, due to failure of combustion, while the overheat switch 32 will be opened whenever the normal operating temperature of the heater is materially exceeded.

It will thus be clear from the foregoing that the control system operates in an efficient and reliable manner to control the pressure at which fuel is supplied to the heater, and that this control means is not only responsive to the temperature of the space being heated, but also has provisions to prevent opening of the fuel supply valve until a certain time sufficient for the igniter to attain ignition temperature has elapsed.

While I have shown and described a preferred embodiment of my invention, it will be apparent that numerous variations and modifications thereof may be made without departing from the underlying principles of the invention. I therefore desire, by the following claim, to include within the scope of the invention all such variations and modifications by which substantially the results of my invention may be obtained through the use of substantially the same or equivalent means.

I claim:

In an electrically controlled valve apparatus, the combination of a valve body having a valve seat therein and having a chamber, a valve cooperable with said seat, a diaphragm forming one wall of the chamber, resilient means urging said valve against said seat, a thermostatic bimetal element, a resilient operating connection between said bimetal element and said valve, electrical means to heat said bimetal element thereby to cause the latter to apply a force through said resilient operating connection in a direction to open said valve, and means responsive to ambient temperature to energize said electrical heating means intermittently for intervals of increasing length as the ambient temperature decreases.

LYNN A. WILLIAMS, JR.

REFERENCES CITED

The following references are of record in the file of this patent:

UNITED STATES PATENTS

| Number | Name | Date |
|---|---|---|
| 1,603,593 | Goodhue | Oct. 19, 1926 |
| 1,662,289 | Whitehead | Mar. 13, 1928 |
| 1,756,688 | Hutchinson | Apr. 29, 1930 |
| 1,885,050 | Smulski | Oct. 25, 1932 |
| 1,886,439 | Wells | Nov. 8, 1932 |
| 1,917,893 | Mancib | July 11, 1933 |
| 2,052,536 | Shivers | Aug. 25, 1936 |
| 2,058,390 | Alban | Oct. 27, 1936 |
| 2,112,047 | Rich | Mar. 22, 1938 |
| 2,143,277 | McCorkle | Jan. 10, 1939 |
| 2,211,301 | Taylor | Aug. 13, 1940 |
| 2,226,761 | Fox | Dec. 31, 1940 |
| 2,249,844 | Martin | July 22, 1941 |
| 2,285,913 | Derrah | June 9, 1942 |
| 2,372,307 | Alexander | Mar. 27, 1945 |
| 2,373,324 | Martin | Apr. 10, 1945 |